Sept. 18, 1951     T. L. HARPSTER     2,568,283
LOW BED TRAILER UNIT
Filed Feb. 10, 1948     2 Sheets-Sheet 1
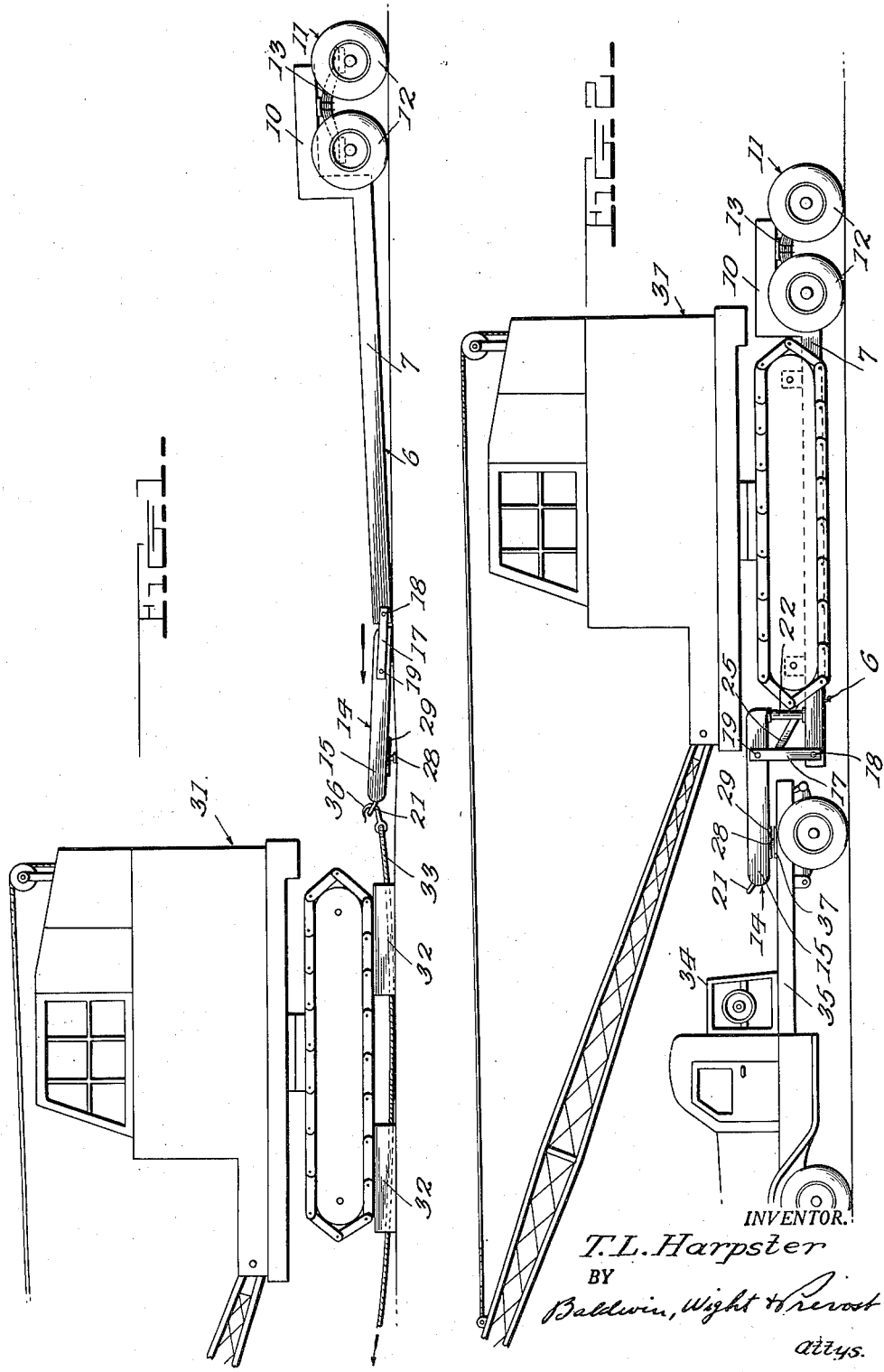
INVENTOR.
T. L. Harpster
BY
Baldwin, Wight & Prevost
attys.

Sept. 18, 1951     T. L. HARPSTER     2,568,283
LOW BED TRAILER UNIT
Filed Feb. 10, 1948     2 Sheets-Sheet 2
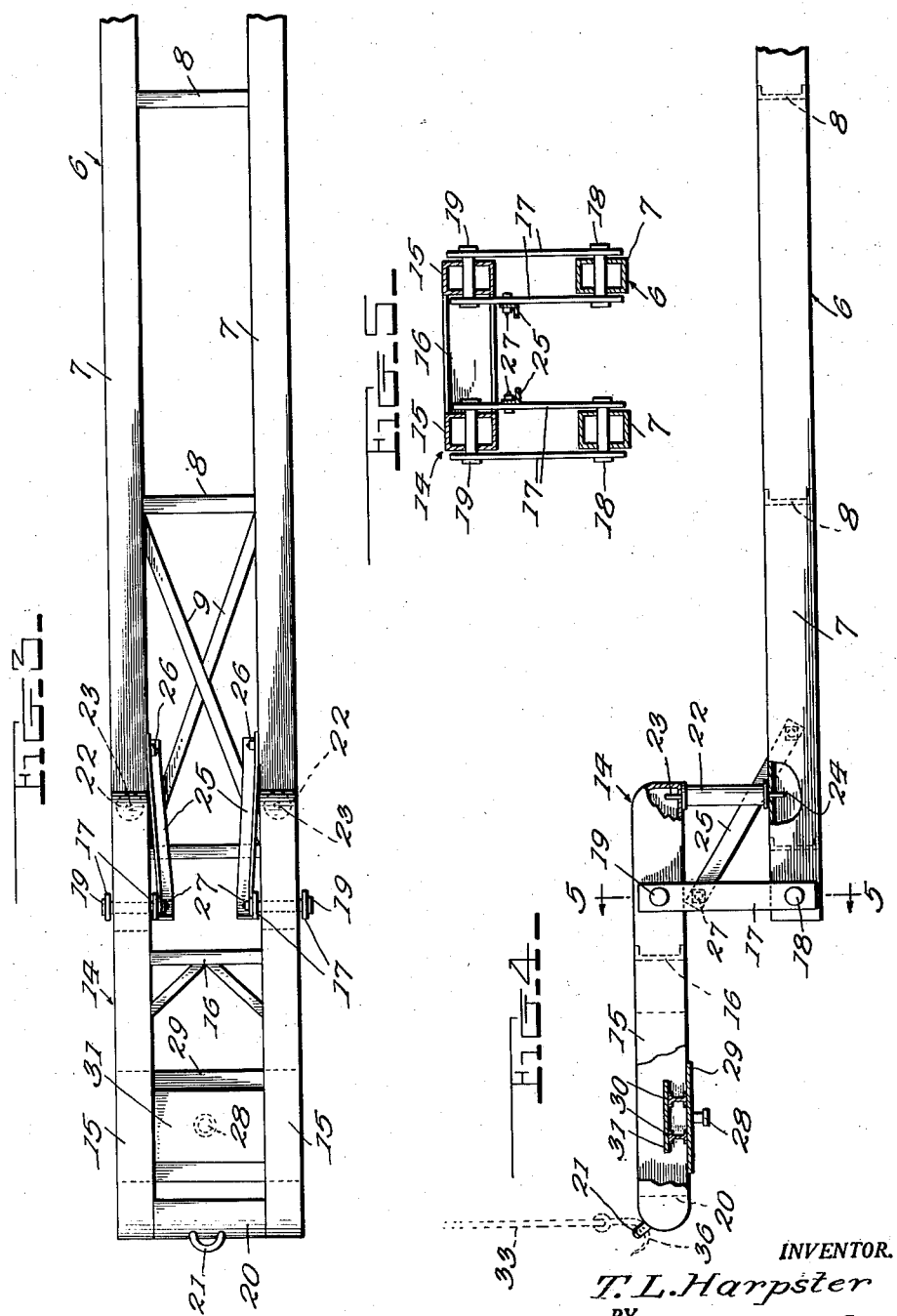
INVENTOR.
T. L. Harpster
BY
Baldwin, Wight & Prevost
attys.

Patented Sept. 18, 1951

2,568,283

UNITED STATES PATENT OFFICE 2,568,283

LOW BED TRAILER UNIT

Tom Levi Harpster, Houston, Tex.

Application February 10, 1948, Serial No. 7,504

4 Claims. (Cl. 214—85)

My invention consists in new and useful improvements in a trailer for moving portable equipment and although it may be employed for transporting various types of equipment, it is particularly designed for use in connection with the transportation of such heavy equipment as drag line machinery, excavators, cranes, etc., which have heretofore presented a considerable problem when moved from one location to another.

The primary object of my invention is to provide a trailer of this type which is not only simple in construction but which greatly facilitates the loading and unloading of heavy equipment with a minimum of man power. My improved trailer is so designed that it may be manipulated in the loading and unloading operations by one man, as distinguished from previously known devices which required the services of several men and involved a series of time consuming operations.

Another object of my invention is to provide a trailer for transporting heavy equipment which is designed for greater safety both to the equipment being hauled and the man operating the same. To this end I have provided a trailer which is rigid and safe in construction, by eliminating the weak points usually found in equipment of this nature; thus reducing highway failures which obstruct the natural flow of traffic.

A further object of my invention is to provide a novel retractable goose neck or hitching element which may be swung longitudinally into the plane of the trailer body or frame during the loading operation, thus, permitting the trailer to pass freely beneath machinery being loaded.

A still further object of the invention is to provide a trailer unit by means of which heavy machinery may be loaded, transported, and unloaded without the use of power from the machinery being transported, these operations being effected by the use of a conventional truck winch.

With the above and other objects in view which will appear as the description proceeds, my invention consists in the novel features herein set forth illustrated in the accompanying drawings and more particularly pointed out in the appended claims.

Referring to the drawings:

Figure 1 is a view in side elevation showing my improved trailer in loading position with its hitching element or goose neck projected;

Figure 2 is a similar view showing the trailer loaded, with the hitching element retracted;

Figure 3 is an enlarged fragmentary plan view of the forward end of the trailer showing the goose neck in retracted or loaded position;

Figure 4 is an enlarged fragmentary view in side elevation with certain parts broken away and shown in section, illustrating the goose neck in retracted position; and Figure 5 is a transverse sectional view taken on line 5—5 of Figure 4.

In the drawings 6 represents generally the horizontal support or frame of my improved trailer which preferably consists of two or more longitudinally extending transversely spaced elements 7 which may be reinforced by cross pieces 8 and angle braces 9, as shown in Figure 3. Although I have shown the elements 7 in the form of boxed in channel members, they may be in the form of T-beams, angle irons, or other structural steel members and the reinforcing elements 8 and 9 may be in the form of heavy duty channels or angles, the entire support or frame being secured together either by bolting or welding at the points of connection to provide a rigid construction.

The rear end of the frame or support 6 is elevated as at 10 and provided with a wheeled truck 11, preferably consisting of two sets of longitudinally spaced wheel elements 12, assembled with a suitable supporting spring structure 13.

As will best be seen from Figures 3 and 4, the forward end of the support or frame 6 carries a retractable hitching element or goose neck generally indicated by the numeral 14, which consists of a pair of longitudinally extending transversely spaced members 15 braced by cross members 16 and articulated to the supports 7 for compound movement, by means of pivoted tension members or links 17. As shown in Figure 5, the members 15 consist of boxed in elements similar to the supports 7 and the links 17 are arranged in pairs, one pair for each member 15. The pairs of links are respectively pivoted to the elements 7 and 15 by transversely extending bolts or the like 18 and 19.

The forward ends of the spaced goose neck elements 15 are connected by a transverse cross bar 20 which, together with the forward edges of the elements 15 is rounded as shown in Figure 4, to eliminate sharp corners. The cross bar 20 is preferably provided with a connecting eye 21 for attaching the hook of a winch line from the truck to lift the forward end of the goose neck as will be hereinafter described.

When the goose neck 14 is in retracted position as shown in Figure 4, its rear end is supported by compression supports 22 which are preferably in the form of sections of heavy duty pipe, the opposite ends of which are provided with pins 23 and 24 adapted to removably fit in complementary openings in the opposed faces of the goose neck elements 15 and the frame elements 7, respectively. I employ one compression support for each set of longitudinal elements 7—15, as will be seen in Figure 3, thus cooperating with the tension members 17 and firmly supporting the rear end of the goose neck 14 entirely across the trailer.

The retractable goose neck 14 may be retained in retracted position by means of detachable links or angle supports 25 which extend between respective longitudinal elements 7 and the pivoted tension links 17. These angle supports may be removably connected to the members 7 and 17 by means of bolts and nuts 26 and 27 respectively, so that they may be readily removed when it is desired to project the goose neck 14 into the loading position in Figure 1.

The goose neck 14 is preferably provided on its underside with a king pin 28 for connection to a truck. In the form shown in the drawings, the king pin 28 is supported on a cross plate 29 which bridges the undersides of the elements 15 and is welded or otherwise secured in place. This structure is reinforced by a pair of spaced I-beams 30 extending between the elements 15 and a second transverse cross plate 31, secured between the elements 15 on top of the I-beams 30. This not only provides a rigid hitching mechanism but further reinforces the goose neck assembly.

Although not illustrated in the drawings, I may, if desired, employ flooring over the frame members 7 and various different arrangements of supports and reinforcements may be embodied to meet varying requirements.

In the loading operation of my improved trailer, referring to Figure 1, the angle supports 25 and the compression supports 22 are removed, permitting the goose neck 14 to be projected longitudinally into a plane which is substantially a continuation of the plane of the trailer support or frame 6. In Figure 1 of the drawings, I have shown as an example, the loading operation for a piece of heavy equipment such as drag line machinery, represented generally by the numeral 31. With this type of equipment the machinery is preferably first rolled up on heavy timbers 32 to elevate the axles and underside of the equipment. A cable 33 from the winch 34 of the truck 35, not shown in Figure 1, but illustrated diagrammatically in Figure 2 is passed under the machinery to be moved, and its hook 36 is inserted in the eye 21 on the forward end of the goose neck 14. The winch 34 is then set in operation and through the medium of any suitable pulleys or the like (not shown), the trailer is drawn forwardly under the machinery 31, so that the latter straddles the longitudinal supports 7 of the frame 6.

The goose neck 14 is then retracted to the position shown in Figure 4, after first inserting the compression supports 22. The angle supports 25 are there affixed. Thereafter, the winch 34 is set in operation to elevate the forward end of the trailer, and the king pin 28 is inserted in a suitable retainer 37 arranged at the rear end of the truck 35. The elevation of the forward end of the trailer by means of the truck winch, lifts the machinery 31 from the timbers 32 and the equipment is ready for hauling. It will be apparent that by my arrangement of the parts comprising the hitching element all of the stresses and strains are efficiently compensated for. The tension members or links 17 cooperate with the compression members 22 in supporting the load and the angle supports 25 provide support against longitudinal displacement of the hitching element 14 while the trailer is in motion.

In unloading, the reverse of the aforesaid operation is effected. In other words, the winch 34 of the truck 35 is employed to lift the goose neck 14 and disengage the king pin 28, after which the truck is moved forwardly and the forward end of the trailer lowered. The angle supports 25 and the compression supports 22 are removed and the goose neck 14 projected to permit the trailer to be freely rolled away from beneath the machinery 31.

It will thus be seen that I have provided a very practical piece of equipment for transporting heavy machinery or the like which is not only extremely safe but which can be manipulated with a minimum of man power. In fact, as no jacking is necessary, the trailer can be placed in a loading position within a matter of seconds by one man and the trailer loaded and readied for travel within three minutes. This naturally represents a considerable saving in time, cost and man power.

With this equipment, I have eliminated many of the complicated pieces of mechanism used in structures of this general nature heretofore. The elimination of complicated parts greatly reduces the expenses usually required for repairs and maintenance.

From the foregoing, it is believed that my invention may be readily understood by those skilled in the art without further description, it being borne in mind that numerous changes may be made in the details of construction without departing from the spirit of the invention as set forth in the following claims.

I claim:

1. A trailer for carrying portable equipment, comprising a relatively narrow, elongated frame adapted to be straddled by said equipment, ground engaging wheel means at one end of said frame, a hitching element articulated on the opposite end of said frame for movement longitudinally into a projected loading position substantially in the plane of said frame, and into a retracted loaded position in a plane substantially parallel to but above that of said frame, tension links intermediate the ends of said hitching element, and compression means comprising at least one post adapted to be interposed between said frame and the adjacent overlying end of said hitching element when the latter is retracted with the opposite ends of said post being removably connected respectively to said frame and to said adjacent end of said hitching element, for supporting said hitching element in retracted position, and means at the opposite end of said hitching element for supporting the latter on a motor vehicle, said post being completely removable from said hitching element and said frame to allow both said hitching element and said frame to rest upon the ground adjacent said links when said hitching element is in projected position.

2. A trailer for carrying portable equipment, comprising a relatively narrow, elongated frame adapted to be straddled by said equipment, ground engaging wheel means at one end of said frame, a hitching element comprising a pair of transversely spaced longitudinal members articulated on the opposite end of said frame by a pair of tension links, pivotally secured intermediate the ends of said members, to provide for movement of said hitching element longitudinally into a projected loading position substantially in the plane of said frame, and into a retracted loaded position in a plane substantially parallel to but above that of said frame, and compression means comprising a pair of vertical posts removably supported on said frame and adapted to be interposed between said frame and the adjacent overlying ends of respective longitudinal members of said hitching element when the latter is retracted, for supporting said hitching element in retracted position, means at the opposite end of said hitching element for supporting the latter on a motor vehicle, and a pair of links removably secured between respective longitudinal members and said frame for locking said hitching element against longitudinal displacement when retracted.

3. A trailer for use with a motor vehicle having a winch and cable unit, for carrying portable equipment, said trailer comprising a relatively narrow, elongated frame, adapted to pass longitudinally beneath said equipment with the latter astride the frame, ground engaging wheel means at one end of said frame, a hitching element articulated on the opposite end of said frame for movement longitudinally into a projected loading position, substantially in the plane of said frame and into a retracted loaded position in a plane substantially parallel to but above that of said frame, means on said hitching element for connecting the latter to said winch and cable unit for elevating the hitching end of said frame, said frame when elevated, embracing the underside of the equipment to be moved, between the ground-engaging elements thereof to sustain the same in elevated position for transportation, means adjacent one end of said hitching element for pivotally suspending said frame from the rear end of said vehicle, tension means intermediate the ends of said hitching element, compression means adjacent the opposite end of said hitching element for supporting the latter when in retracted position, and means for locking said hitching element against longitudinal displacement when retracted.

4. A trailer for carrying portable equipment, comprising a frame composed of at least two elongated, transversely spaced supports, ground engaging wheel means at one end of said supports, a hitching element composed of at least two transversely spaced, longitudinally extending supports, said last named supports being secured together and articulated on the opposite end of said frame for compound movement longitudinally into a projected loading position, substantially in the plane of said frame and into a retracted loaded position in a plane substantially parallel to but above that of said frame by tension links pivotally connected between the intermediate portion of said hitching element and said frame, a pair of compression posts removably interposed between the overlying rear ends of respective hitching element supports and said frame when said hitching element is retracted with the opposite ends of said posts being removably connected respectively to said frame and to said rear ends of said hitching element supports, and means for suspending said hitching element and frame from a motor vehicle, said posts being completely removable from said hitching element and said frame to allow both said hitching element and said frame to rest upon the ground when said hitching element is in projected position.

TOM LEVI HARPSTER.

REFERENCES CITED

The following references are of record in the file of this patent:

UNITED STATES PATENTS

| Number | Name | Date |
|---|---|---|
| 1,693,869 | Ronk | Dec. 4, 1928 |
| 1,860,518 | Wells | May 31, 1932 |
| 2,312,769 | Mosling | Mar. 2, 1943 |
| 2,350,841 | Troche et al. | June 6, 1944 |
| 2,389,211 | Pointer | Nov. 20, 1945 |
| 2,431,436 | Townsend | Nov. 25, 1947 |
| 2,443,611 | Ferguson | June 22, 1948 |
| 2,452,789 | Pike | Nov. 2, 1948 |